United States Patent [19]

Perrin et al.

[11] Patent Number: 4,489,819
[45] Date of Patent: Dec. 25, 1984

[54] PNEUMATIC GRIPPER FOR A NAILING MACHINE

[76] Inventors: Lloyd E. Perrin, 652 Choctaw Dr., San Jose, Calif. 95123; Donald H. Cronquist, Jr., 4300 Albany Dr., #230, San Jose, Calif. 95129

[21] Appl. No.: 236,469

[22] Filed: Feb. 20, 1981

[51] Int. Cl.³ .............................................. B65G 47/24
[52] U.S. Cl. .................................... 198/403; 198/486; 198/694; 227/40
[58] Field of Search ............... 294/63 A, 93; 198/694, 198/479, 695, 486, 696, 403, 653, 375; 414/750, 751, 763, 779, 783, 33, 34, 71; 227/40, 45, 48

[56] References Cited

U.S. PATENT DOCUMENTS

| 2,247,168 | 6/1941 | Fontaine | 294/63.2 |
| 3,480,161 | 11/1969 | Bason | 414/71 |
| 3,658,315 | 4/1972 | Boucherie | 198/694 |

Primary Examiner—Robert J. Spar
Assistant Examiner—Jonathan D. Holmes
Attorney, Agent, or Firm—Fitch, Even, Tabin & Flannery

[57] ABSTRACT

This invention concerns an apparatus for charging pneumatic gripper heads and maintaining the charge while the heads move between spaced locations.

5 Claims, 24 Drawing Figures

FIG_1

FIG_2

FIG_12

FIG_13

PNEUMATIC GRIPPER FOR A NAILING MACHINE

BACKGROUND OF THE INVENTION

1. Field of the Invention

The present invention generally relates to apparatus for supplying air to air-actuated grippers, and more particularly concerns an apparatus for charging the expansible chamber of a pneumatic gripping mechanism and maintaining the charge for a predetermined time after the gripper moves out of engagement with the charging means.

2. Description of the Prior Art

One method of maintaining a charge on a pneumatic gripper as it moves along a given path while conveying or pulling articles from one place to the other involves connecting a flexible hose or the like between the pneumatic gripper and a source of pressurized air, and arranging the apparatus so that the hose can travel along with the gripper. This system involves a dangling hose that could get tangled up or wrapped around other equipment.

The present invention provides apparatus for charging pneumatic grippers at one location and maintaining the charge on the gripper while it moves through its assigned path of travel.

SUMMARY OF THE INVENTION

The apparatus includes air supply means at an article pickup area that engages an air inlet member of a pneumatic gripper when the gripper is at the pickup area, and directs a charge of air into the expansible inner chamber of the gripper, and means for trapping the air in the chamber after the pneumatic gripper moves away from the pickup area. More specifically, the air supply means includes a pair of chucks that are mounted in fixed position on a carriage which supports a plurality of wooden stringers that are to be used in fabricating a pallet. The gripping mechanism includes a pair of gripper heads that are mounted on a chain for reciprocating movement between the stringer pickup area and a pallet-discharge area, each head having an internal expansible chamber. When each gripper head reaches the pickup area, it engages one of the chucks and receives a charge of air. At a later interval, when the gripper heads move out of engagement with the chucks, a check valve in each head maintains an effective charge of air in the chamber so that the engagement of the heads with the stringers is maintained.

DESCRIPTION OF A PREFERRED EMBODIMENT

Figures 1, 2:
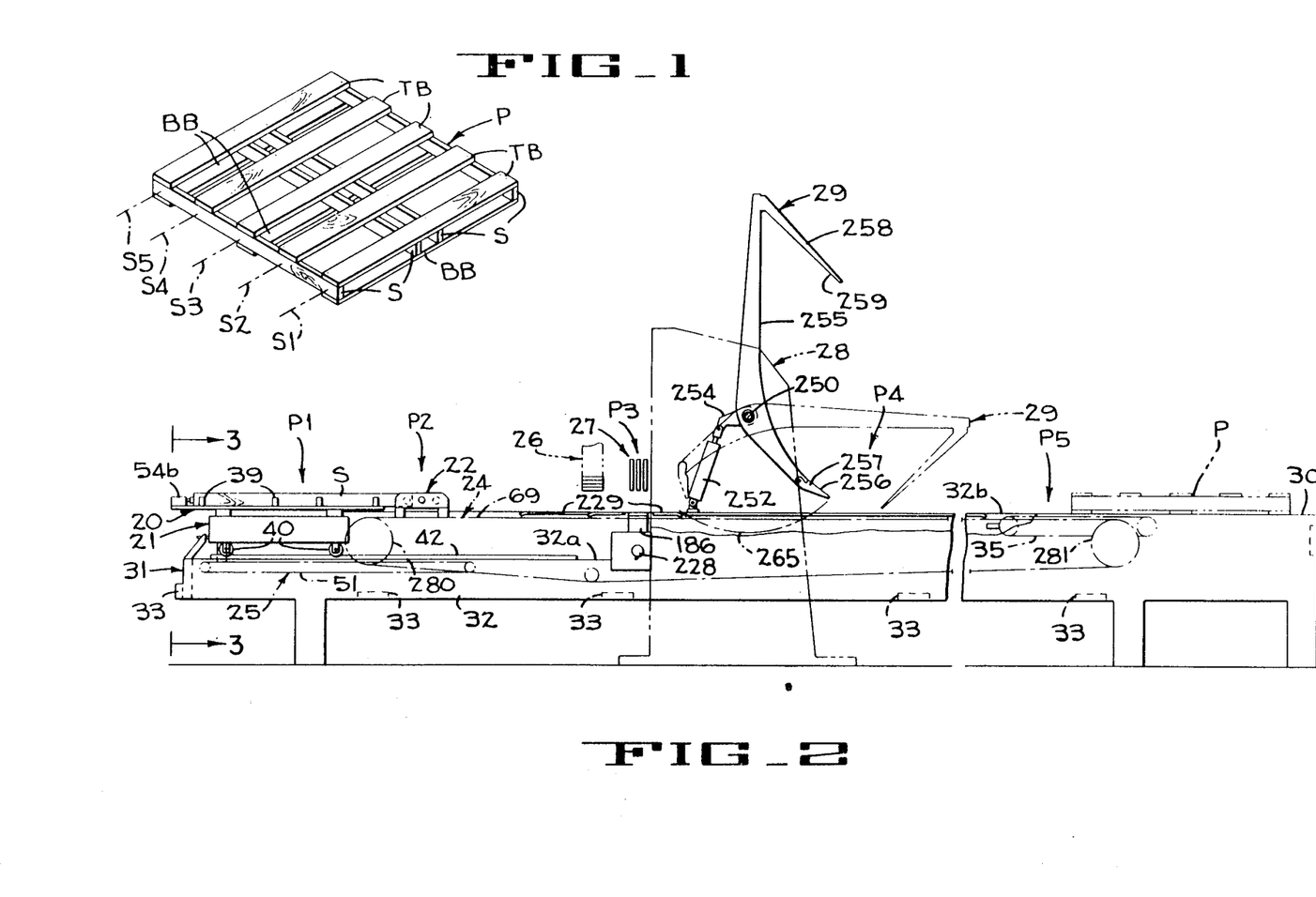
FIG. 1 is an isometric view of a pallet of the type that is fabricated by the machine of the present invention.
FIG. 2 is a schematic side elevation of the pallet-assembly machine.
Figure 2A:
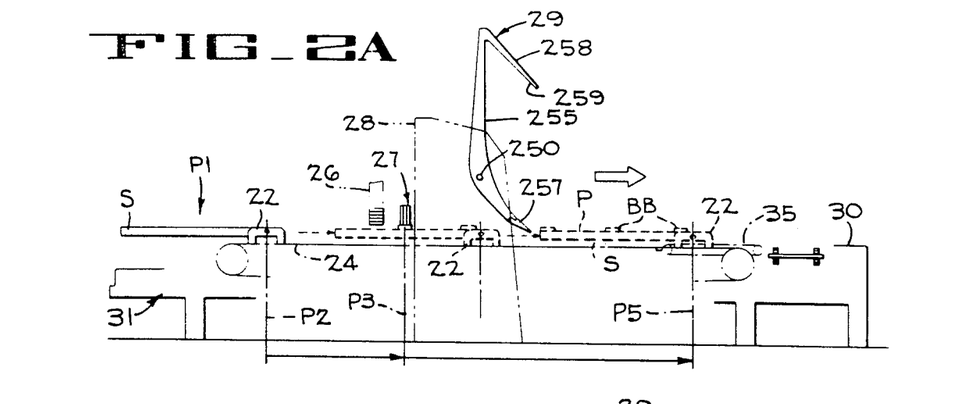
FIGS. 2A–2D are a set of diagrammatic partial side elevations of the machine, showing the sequence of operations that the machine performs in making pallets.
Figure 2B:
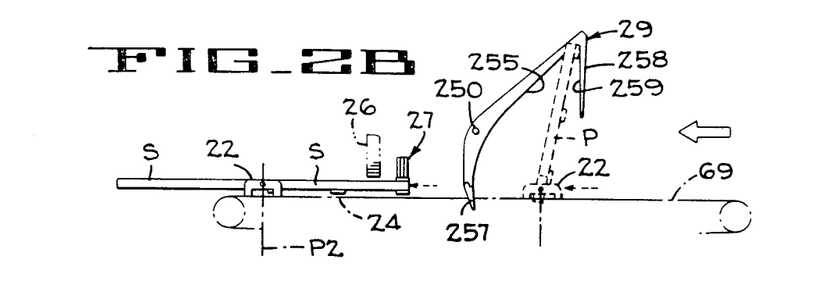
Figure 2C:
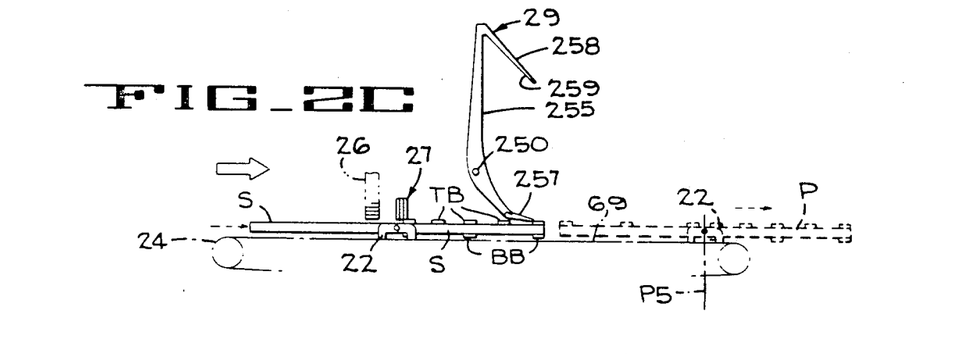
Figure 2D:
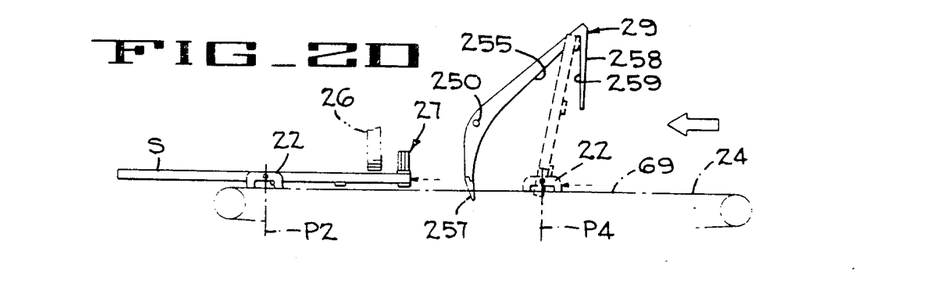

In FIG. 1 is illustrated a pallet P of a type that is fabricated by the machine of the present invention. The pallet comprises a series of spaced, parallel, longitudinally-extending stringers S to which a plurality of top boards TB and a plurality of bottom boards BB are nailed. The sequence followed by the machine in first nailing bottom boards to the stringers and then the top boards is schematically indicated in FIGS. 2A-2D. In general, at Station P1 the operator places the four stringers S in parallel position on a fixture 20 mounted on a roller carriage 21. A gripper head 22, which is carried back and forth in a horizontal path by a chain drive mechanism 24, is then moved to the left to Station P2 into gripping engagement with the leading edges of the two outermost stringers. The gripper head 22 is next moved to the right, pulling the carriage with it toward a nailing Station P3. An air motor drive mechanism 25 also urges the stringer carriage toward nailing Station P3 and, when the leading ends of the stringers reach that station, the gripper heads release the carriage and the drive mechanism 25 holds the carriage in a stationary position. A deckboard is moved forwardly from a hopper 26 and positioned on the leading ends of the stringers under a series of nailing chucks 27 of a nailing machine 28 which drive nails down through the deckboards and into the stringers. When the first deckboard has been nailed in place, the gripper head is again indexed to bring the middle sections of the stringers under the nailing chucks at Station P3 and a second deckboard is positioned on the stringers under the nailing heads and nailed to the stringers. This indexing movement of the gripper head and the positioning and nailing of deckboards is continued until the predetermined desired number of bottom deckboards has been nailed to the stringers. It will be noted that, during the indexing movement of the gripper head, the stringers are progressively pulled out of the stationary fixture 20 and the half-pallet is partially completed, the air motor drive mechanism 25 returns the stringer carriage and its fixture to Station P1 to receive another set of stringers.

When the last bottom deckboard has been nailed on the stringers, and the formation of a half-pallet has been completed, the gripper is moved to Station P5 at the end of its travel to the right. At this point the anvil is lowered by one deckboard thickness. The movement of the gripper head is then reversed and it pushes the half-pallet toward the left and through an inverting mechanism 29 at Station P4 at which the half-pallet is turned upside down. While the half-pallet is being inverted, the gripper head moves to a position ahead of the half-pallet and continues its movement toward the left. When it reaches Station P2 it engages with the new stringers that have been positioned there by the operator. When the stringers have been engaged, the gripper head moves toward the right to progressively move the stringers through Station P3 where the five top deckboards are nailed thereon. The nailing anvil is raised by one deckboard thickness and the gripper head then moves the new stringers through Station P3 to have three bottom deckboards nailed thereon. When the gripper head reaches reversing Station P5, the completed pallet, which is moving along ahead of the gripper, is released by the gripper and moved onto a flat support surface 30 at the end of the frame of the machine by a conveyor 35. During its subsequent movement to the left, the gripper moves the half-pallet through the inverter at Station P4 and continues back to Station P2 to grip a new set of stringers put in place by the operator.

Figure 3:
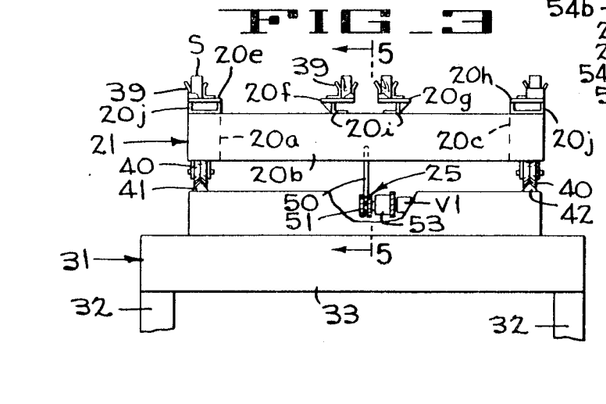
FIG. 3 is a schematic end elevation of the machine taken looking in the direction of arrows 3—3 of FIG. 2.
Figure 4:
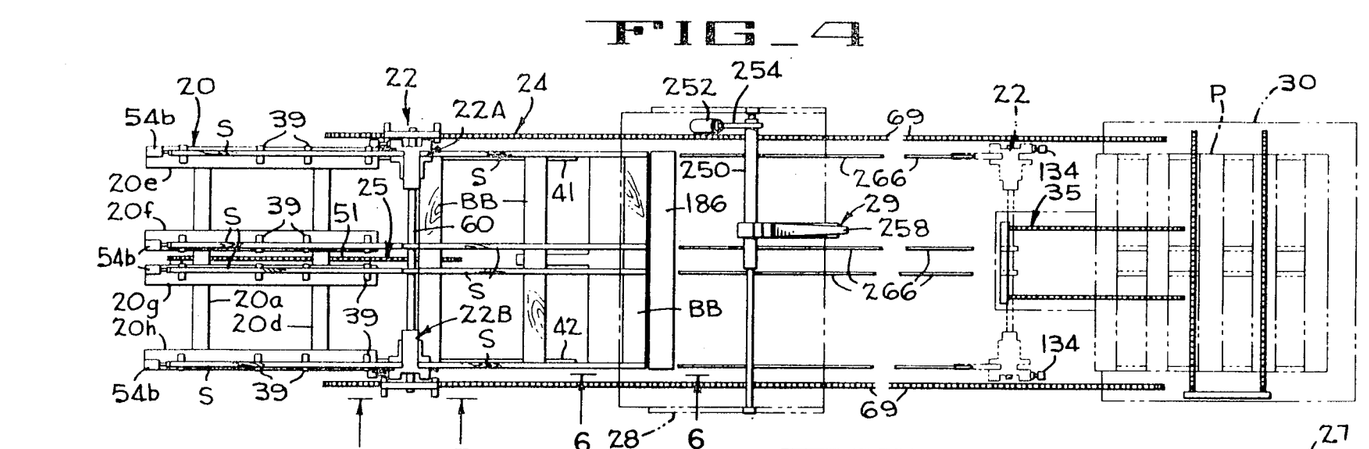
FIG. 4 is a schematic plan view of the machine.

The pallet assembly machine comprises an elongate frame support structure 31 having spaced side walls 32 and transverse beams 33 extending between the side walls to form a rigid unitary structure. It will be noted that the upper surface 32a of the side walls are at one elevation from the infeed end of the machine to a point just past the nailing chucks 27 and that thereafter the surface 32b of the side members is at a higher elevation. The stringer carriage 21 includes four rigid plates 20a–20d (FIGS. 3 and 4) secured together to form a rectangular frame, and four longitudinally-extending plates 20c–20h secured on the upper ends of angle brackets 20i and upwardly opening channel brackets 20j. A plurality of upwardly-opening U-shaped spring clips 39 (FIG. 3) are secured to the plates 20e–20h to form four lines of clips, the clips of each line being in alignment longitudinally of the machine. Four wheels 40 are mounted on the underside of the carriage, two on each side under the side plates 20a and 20c, and these wheels are arranged to roll along the upper surface of two spaced tracks 41 and 42. The tracks are mounted on the machine frame 31 and extend from the left end (FIG. 1) of the machine to a point just upstream from the deckboard hopper 26. The drive mechanism 25 which moves the carriage along the tracks 41 and 42 includes a pusher arm 50 (FIG. 5) carried on and projecting upwardly from the upper run of an endless chain 51. The arm 50 is secured at its upper end to an L-shaped angle 52 carried by the transverse member 20b of the carriage so that, when the upper run of the chain is driven to the right (FIG. 1), the lug will move the carriage to the right whereas, if the chain is driven to the left, the lug will push the carriage toward the left. The endless chain 51 (FIG. 3) is driven by an air motor 53 controlled through a solenoid-operated valve V1. A stop 54a carried by a transverse member of the frame of the machine limits the movement of the stringer carriage toward the left while a stop 54b, carried on each of the four longitudinal members 20e–20h of the carriage, act as positioning members for one end of each stringer.

Figures 10, 11:
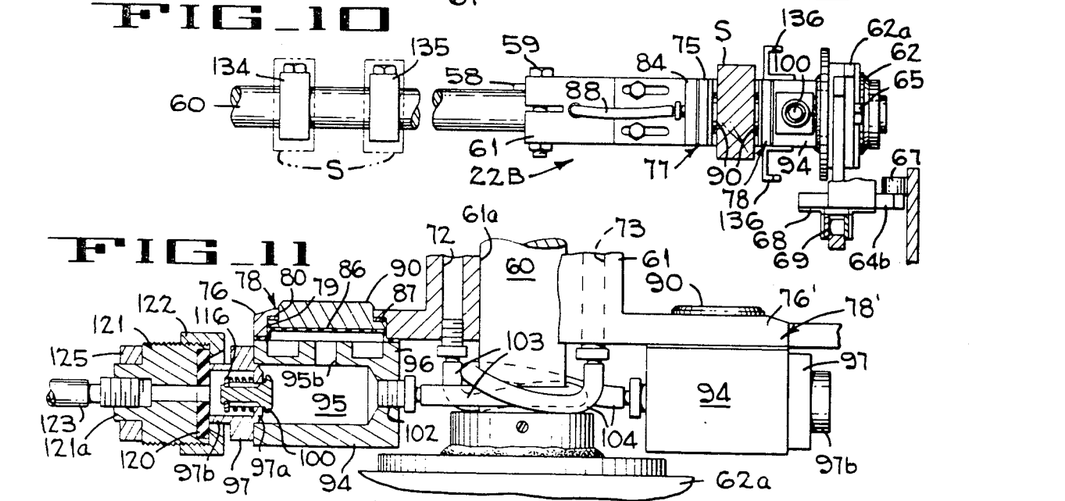
FIG. 10 is a fragmentary section taken on line 10—10 of FIG. 7.
FIG. 11 is an enlarged view of a portion of FIG. 9.

The gripper carriage 22 is made up of two gripping heads 22A and 22B (FIG. 4) which are identical but oppositely disposed near opposite ends of a cross-shaft 60. Each of the units includes a cylindrical housing 61 connected by a key 58 (FIG. 9) and by clamping bolts 59 to the cross-shaft 60 that is rotatably journalled at each end in a bearing 62. Each bearing 62 is locked to a carrier bracket 64 by bolts 65 which secure each end of a plate 62a of the bearing assembly 62 to the carrier bracket. Each bracket 64 has an upstanding arm 64a and a laterally-extending arm 64b at right angles to arm 64a and carrying a roller 67 near its end. The arm 64b of each bracket 64 is mounted on a pair of angle links 68 (FIG. 10) of a drive chain 69 which, as seen in FIG. 2, extends from a point upstream of Station P2 to a point past Station P5.

The cylindrical housing 61 of each gripper unit has a central cylindrical opening 61a receiving the shaft 60 and a pair of passages 72 and 73. On one side, the housing 61 has two spaced flanges 75 and 76 projecting outwardly, the flange 76 being formed integrally with the housing 61 and the flange 75 being one arm of an angle secured to the housing. The flange 75 carries a gripper unit 77, and the flange 76 carries a gripper unit 78. Diametrically opposite the flanges 75 and 76 on the cylindrical housing 61 are identical flanges 75' and 76', respectively, the flange 75' carrying a gripper unit 77' and the flange 76 carrying a gripper unit 78'. Each of the four flanges has a cylindrical opening 79 (FIG. 11) concentric with a reduced diameter opening 80 adjacent one face of the flange. A plate 84 (FIG. 9) having an annular groove 85 formed therein is secured, by capscrews or the like, to each of the flanges 75 and 75' with the annular groove in confronting relation with the cylindrical opening 79 in the flange and providing a pressure chamber that is closed on one side by a rubber diaphragm 86 which is locked between the plate 84 and the flange. The passages 72 and 73 in the housing 61 communicate with the pressure chambers by conduits 88 and 89 respectively which are connected to fittings that are in flow communication with the passages and the chambers. A pressure pad 90 is positioned adjacent one face of each of the diaphragms 86 and is disposed for reciprocating movement in the cylindrical opening 79 provided by the associated flange. A wave washer spring 87 (FIG. 11) is positioned between the pressure pads 90 and the housings 75 and 76.

Similarly, a housing 94 is secured to each of the flanges 76 and 76' and each housing has one wall 96 provided with an annular groove which confronts the opening 79 in the adjacent flange and provides a pressure chamber which is bounded on one side by the diaphragm 86 that is carried by the flange. Each of the housings 94 is hollow and provides a central chamber 95 communicating respectively with the pressure chambers in the flanges 76 and 76' by a short passage 95b.

Each housing 94 is closed at one end by a cylindrical member 97 that is secured to the housing 94 and has an inwardly projecting flange 97a which provides a seat for a check valve 100. At one end the member 97 has a reduced diameter end 97b. A fitting 102 is connected in an end wall of each housing 94, one fitting communicating through a flexible conduit 103 with the passage 72 in the housing 61 and the other fitting communicating with passage 73 through flexible conduit 104. Each of the check valves 100 is urged to a closed position by a coil spring disposed around the stem of the valve between a snap ring 116 on the valve stem and the inwardly projecting flange 97a.

When a pair of gripper units, either 77, 78 or 77', 78' approach Station P2, the reduced diameter end of the leading housing 94 engages a rubber pad 120 that is held in a cylindrical recess in a cylindrical chuck 121 by a retainer ring 122. The rubber pad and the chuck 121 have aligned central passages that communicate with a flexible conduit 123 leading to a supply of pressurized air. The chuck 121 has a cylindrical end 121a that is pressed in a plate 125 (FIG. 7) which has a hole at each end that slidably receives a rod 127. Each rod 127 is locked by a nut 128 on a plate 130 which is secured to and projects upwardly from a lateral extension 131 of the stringer carriage 21. The plate 130 also slidably supports conduit 123. A coil spring 133 is disposed around each rod 127 between the plates 125 and 130. Just before the gripper units reach Station P2, the contact of the end of the housing 94 with the rubber pad 120 causes the chuck, the conduit 123, and the plate 125 on which the chuck is mounted to move slightly toward the left (FIG. 7) against the resistance of the springs 133. When the gripper units arrive at Station P2, a valve (to be described presently) in the control system establishes communication between conduit 123 and the source of pressurized air, causing the air to pass through the chuck and move the head of the check valve 100 off its seat. The pressure chambers adjacent the diaphragms 86 of whichever pair of opposed housings 84, 94 or 84', 94' is at Station P2 receive air and the chambers are expanded to urge the gripping pads 90 into gripping engagement with the two outermost stringers. One of the pads in each pair is slightly larger in diameter than its cooperating pad. Accordingly, when the gripper heads are subsequently moved toward the right (FIG. 1) and the stringer carriage is moved along with the heads, the leading ends of the four stringers are brought to a position at the nailing station P3. Also, when the gripper heads arrive at Station P2 the sides of the two housings 61 and two stops 132 and 132a, that are adjustably mounted on the cross bar 60 between the gripper heads, engage the ends of the four stringers and flush them into a common plane extending transversely of the machine.

Figures 7, 8, 9:
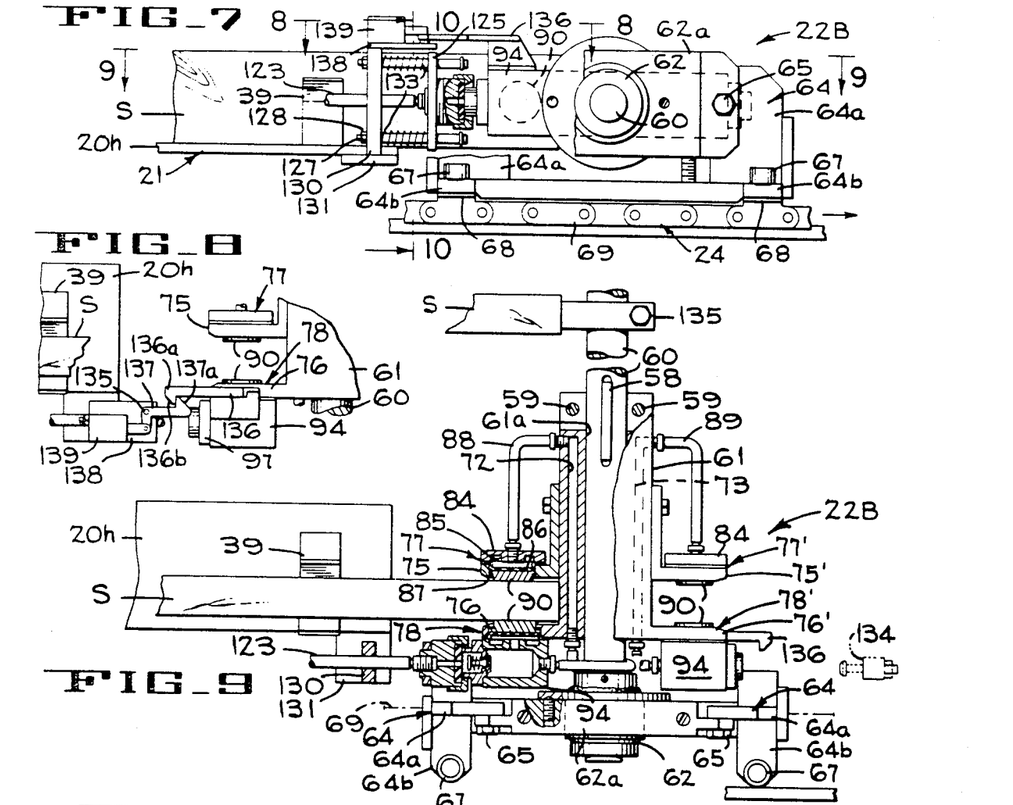
FIG. 7 is a fragmentary side elevation taken along line 7—7 of FIG. 4, particularly showing the gripper carriage.
FIG. 8 is a fragmentary plan view taken looking in the direction indicated by arrows 8—8 of FIG. 7.
FIG. 9 is a fragmentary plan taken as indicated by line 9—9 of FIG. 7.

Referring to FIG. 8, a rigid latch bar 136 is mounted on each flange 76 and 76' of the housing 61 on the side of the flange that faces upwardly when that flange is at the stringer pick-up end of the machine. The latch bar has a laterally-projecting end 136a with a slanted leading edge 136b adapted to engage the slanted leading edge 137a of a latch lever 137 and pivot the latch lever 137 clockwise about a pin 135 that mounts the lever on an upper flat horizontal plate 138 which is secured to the upper end of the chuck-support plate 130. It will be evident that, as the gripper head moves toward the left (FIG. 8), the latch bar 136 will pivot the lever 137, and move past it as the head moves into engagement with the air chucks 121. Then, when the gripper heads again move toward the right, the latch bar will engage the latch lever and pull the stringer carriage with the gripper heads. When it is desired to release the gripper carriage from the gripper heads to permit it to return to the loading station, the lever 137 is pivoted clockwise by a solenoid 139 mounted on the plate 138.

During an initial part of the operation when deckboards are being nailed on the stringers that trail the gripper carriage, the stringer carriage moves along with the gripper carriage and the gripper heads remain in engagement with the air chucks 121. During the deckboard-adding operation, the stringer table is moved rearwardly away from the gripper carriage to return to its initial position to receive another set of stringers. The check valve 100 of each gripper head is effective to lock a charge of air in the gripper head that holds the pads 90 in gripping engagement with a stringer all during the time that bottom boards are nailed to one side of the stringers to form a half-pallet, the half-pallet is moved rearwardly and inverted, and then moved forwardly again to have deckboards nailed to its other side. When the completed pallet reaches station P5, each of the two gripper heads that are advancing the pallet move into engagement with an abutment 134 that is shown in phantom lines at the right side of FIG. 9. The end 97b of the gripper head housing 94 telescopes over the abutment which engages and unseats the valve 100 to vent the gripper head and release the pallet so that the diverter conveyor 35 can discharge the pallet. The abutment 134 is shown in phantom lines in FIG. 9 since it is out of its actual location near the conveyor 35.

The deckboard feeder comprises the deckboard hopper 26 made up of four upright angle members 141–144 (FIG. 13) which define the corners of the hopper. The angle members 141 and 142 are identical, only facing in opposite directions to define the forward inside corners of the hopper. Similarly, the members 143 and 144 are identical but oppositely disposed and define the rear corners. The corner members are positioned between two mounting plates 147 and 148 which, in turn, are positioned between two plates 149 and 150, each of which is secured to and projects upwardly from a member 151a of a side bracket 151 (FIG. 12) projecting from each side of the support structure of the nailing machine 28. Two box beams 152 and 153 are secured to and extend between the outer plates 149 and 150, and the inner plates 147 and 148 are adjustably slidable on these box beams by means of box-like collars 154, one of which is secured to both the forward and the rear ends of each of the inner plates. Each of the rear corner members 143 and 144 of the hopper is mounted on one of the members 154a of an adjacent collar 154 and, accordingly, the rear corner members 143 and 144 of the hopper are mounted for movement laterally of the machine with the inner side plates 147 and 148. On its outer face, each of the front corner members 141 and 142 carries a forwardly-extending plate 155 having holes arranged to receive bolts 156 therein, and each bolt extends through one of two slots 156a in the plate 147 or plate 148. Thus the front corner members are mounted directly on the plates 147 and 148 for adjusting movement toward and away from the rear corner members to vary the width of the deckboard hopper and for lateral adjustment with the rear corners to vary the length of the hopper. The inner plates 147 and 148 on which the corner members are supported are moved laterally of the machine on the box beams 152 and 153 by a feed screw 160 which is rotatably journaled in the outer side plates 149 and 150 and has oppositely cut threads at either end to engage nuts 161 mounted in each inner plate 147 and 148. When the feed screw is rotated, the plates 149 and 150 move toward or away from each other.

Figures 5, 6:
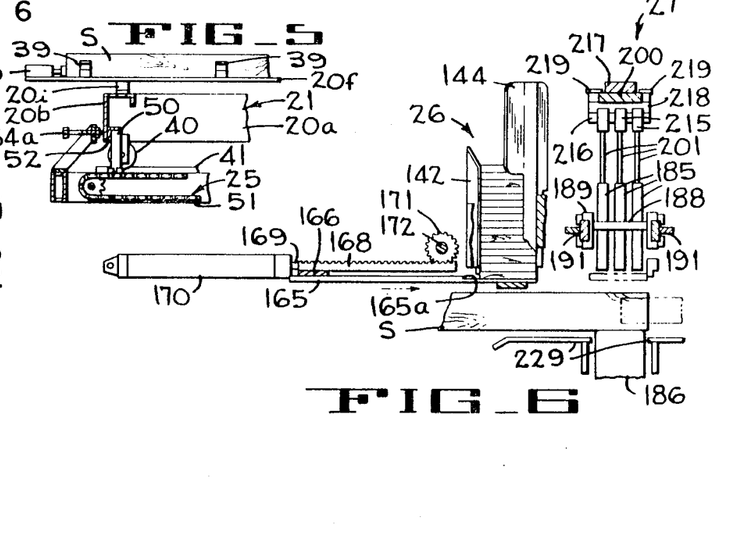
FIG. 5 is a schematic section taken on line 5—5 of FIG. 3.
FIG. 6 is a fragmentary side elevation taken in the general area indicated by line 6—6 of FIG. 4.

The bottom deckboard is removed from the hopper and fed forwardly to the nailing position by means of two stripper bars 165 (FIG. 14) which are carried on a connecting plate 166 that extends transversely of the machine and is connected at its ends to the underside of two racks 167 and 168. Each rack is carried on the outer end of the piston rod 169 of a double-acting pneumatic power cylinder 170 (one only being shown in FIG. 14). The movements of the two racks are coordinated by two pinions 171 that are keyed to a transverse shaft 172. As seen in FIG. 6, each stripper bar 165 has a forward surface and a rearward surface separated by a pusher shoulder 165a. When one end of each of the power cylinders is energized, each piston rod is projected out of the cylinder and the pusher shoulder 165a of the stripper bar engages the lowermost deckboard and pushes it out from under the stack and into a position under the chucks 27 of the nailing machine. As the stripper bars are moving forwardly to position a deckboard, the stack of deckboards moves downwardly bringing the lowermost deckboard onto the forward surfaces of the stripper bars rearwardly of the pusher shoulders 165a. Then, when the other ends of the power cylinders are energized, the stripper bars 165 move rearwardly, causing the lower edges of the rear corner members 141 and 142 of the hopper to strip the deckboard from the upper surfaces of the bars and causing it to assume a position forwardly of the pusher shoulders 165a when the stripper bars come to rest in its retracted position.

The nailing machine 28 is of the type disclosed in the patent to Richards U.S. Pat. No. 2,856,606 with certain changes in the mounting of the nail chutes, the nail punches, and the anvil against which the pallets are nailed. In all other respects the present nailer 28 follows the teachings of the Richards patent which is incorporated herein by reference.

Figures 12, 13:
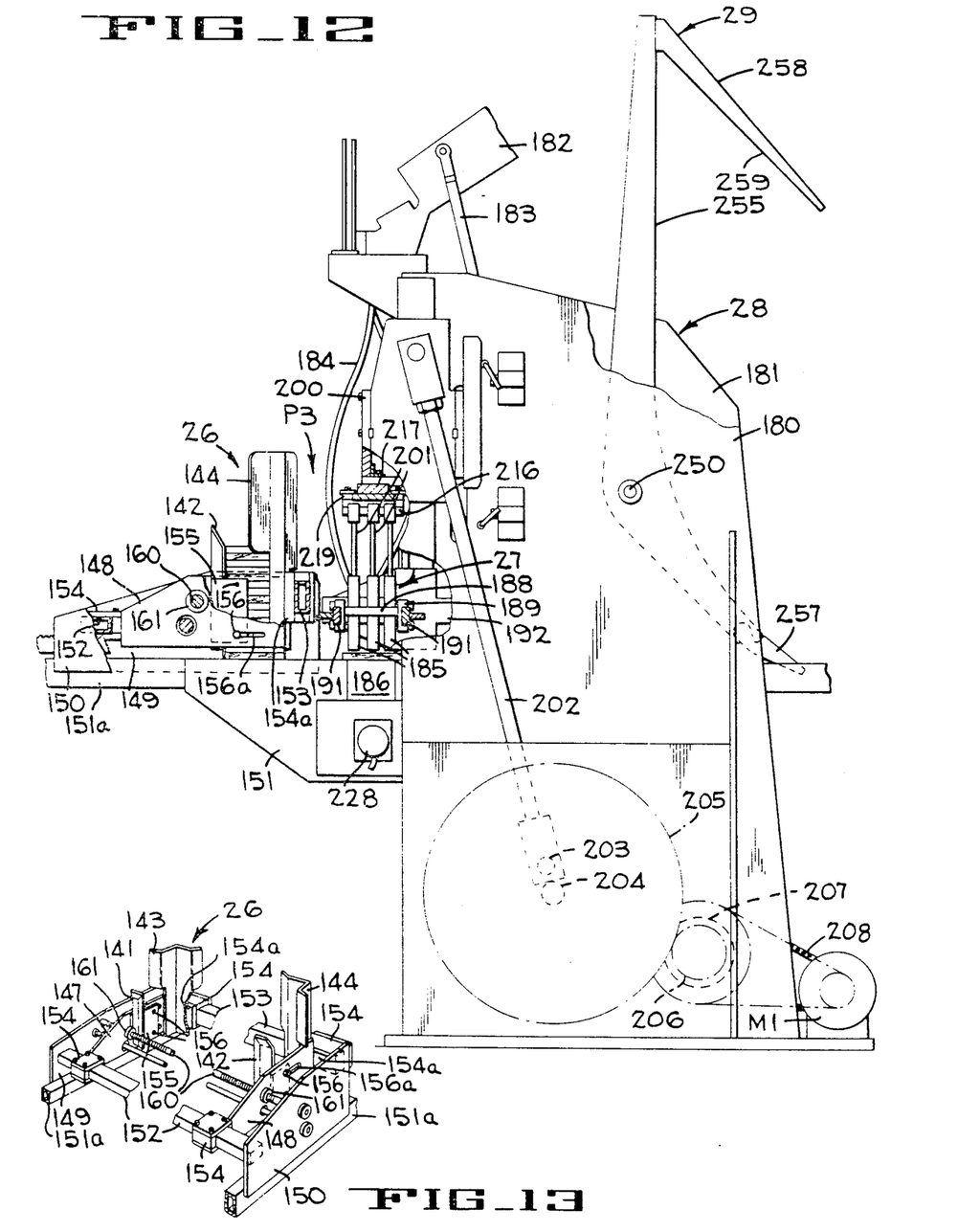
FIG. 12 is a side elevation, with parts broken away, of the nailing machine used in the present pallet-assembly machine.
FIG. 13 is a fragmentary schematic isometric of the deckboard hopper mounted on the nailing machine of FIG. 12.

In general, the nailer comprises a support structure which includes a pair of support walls 180 and 181 (FIG. 12). A shaker type nail feed mechanism is mounted at the upper end of the support structure and includes a nail hopper 182 which is continuously oscillated in a vertical direction by a rod 183 connected to a crank. Nails are directed from the hopper into a plurality of parallel downwardly-inclined runways each of which has a rotary nail pick at its lower end for removing nails one by one from the runway and dropping them into a funnel for delivery through a tube 184 to a nail chuck 185 disposed in spaced relation above an anvil 186. In the Richards machine there are twelve nail-picking units disposed in side-by-side relation across the machine for directing nails into twelve chucks which are also disposed in side-by-side relation extending across the machine. In the present machine, there are twelve nail-picking units disposed side-by-side exactly as in the Richards machine, however, the nail chucks 185 are arranged in four units each having three chucks disposed in a line extending longitudinally of the machine in a manner to be described presently. The tubes extending between the funnels of the nail-picking units to the chucks are made of a suitable length and bent to accommodate the longitudinal disposition of the chucks.

Figure 14:
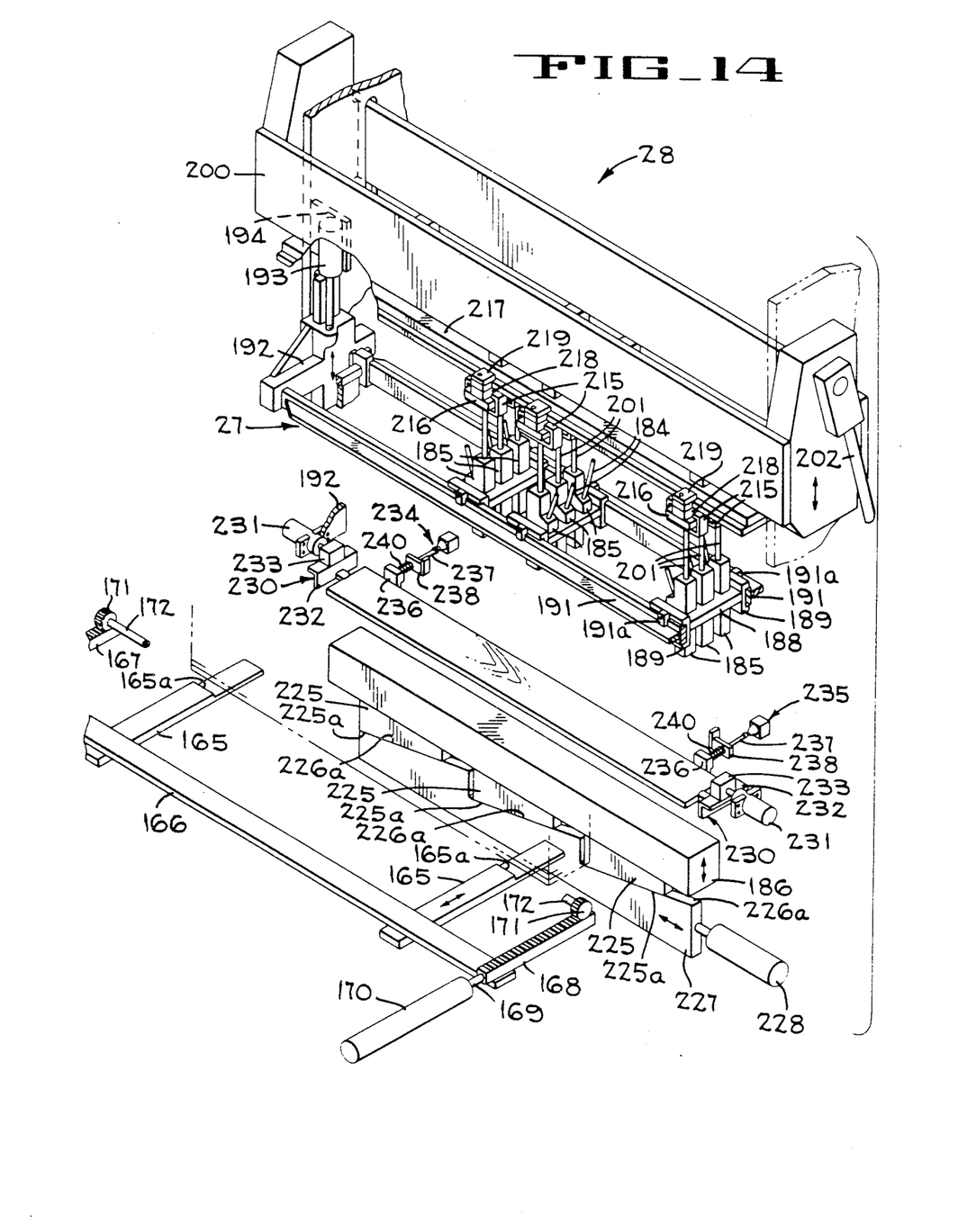
FIG. 14 is an exploded fragmentary isometric view of parts of the nailing machine of FIG. 12.

In FIG. 14, three of the four chuck units are shown, one being omitted to show other structure. Each unit comprises a plate 188 in which three chucks are mounted in upright position. At each end the plate 188 has a U-shaped slide 189 and each slide is disposed on a transverse bar 191 and is locked thereon by a releasable clamp 191a. Each of the transverse bars 191 is secured at each end in an end plate 192 (one only being shown in FIG. 14). Each end plate is raised and lowered by means of a double-acting pneumatic power cylinder 193, each cylinder being mounted on a plate 194 secured to and extending inwardly from one of the side walls 180 or 181 of the machine.

The nails are forced out of the chucks and into the deckboards and stringers by a vertically reciprocable nail-driving head 200 (FIG. 14) which carries twelve punches 201 (nine only being shown), each punch being adapted to pass downwardly into one of the chucks to contact the head of the nail therein. The nail-driving head is reciprocated in a vertical direction by a rod 202 (FIG. 12) connected to a power-driven crank 203. Crank 203 is rotated by a shaft 204 which is driven, through meshing gears 205, 206, a selectively-operable electrically-actuated clutch-brake unit 207, and a chain drive 208, by a continuously operating electric motor M1.

In the Richards machine, the twelve nail punches are mounted in side-by-side relation to move downwardly through the twelve side-by-side chucks. In the present machine, the twelve punches 201 (FIG. 14) are mounted in four groups of three generally longitudinally-aligned punches and are disposed directly above the grouped chucks 185 therebelow. Each of the punches has a bracket 215 at its upper end which has inwardly extending arms overlying the opposite side edges of a short plate 216 that extends under a horizontal plate 217 connected to the nail-driving head 200. Each plate 216 has a short bar 218 secured to and extending along its upper surface, and each bar 218 is adjustably clamped to the horizontal plate 217 of the driving head 200 by a clamp 219. Accordingly, it is evident that each group of three nail punches can be easily aligned over a group of three chucks for movement down through the chucks as the head 200 is moved downward and up out of the chucks when the head is lifted.

The anvil 186 is mounted directly below the nailing chucks and comprises a steel bar of generally square cross-section having three lift plates 225 secured in a line longitudinally of the anvil to the undersurface of the anvil. Each lift plate has an inclined lower surface 225a that engages one of three oppositely inclined surface 226a on an actuator bar 227 carried on the end of a double-acting power cylinder 228. The anvil 186 is supported and guided in the support structure of the machine for movement in a vertical direction, and the actuating bar 227 is supported and guiding for movement in a horizontal direction under the urging of power cylinder 228. Referring to FIG. 6, it will be noted that, when new stringers are advanced to nailing position P3 they have no deckboards on their lower side. Accordingly, at this time, the anvil 186 is raised enough to support the stringers. When a half pallet moves through the nailing position, it has deckboards on its lower side and the anvil then remains in its lowered position with its support surface flush with the surface of two support plates 229 that extend across the machine.

During the nailing operation the deckboard is held between two clamps 230 (FIG. 14), each of which is actuated by a double-acting pneumatic power cylinder 231 that is mounted on the frame 192 of the chuck assemblies. Each clamp comprises a board-engaging member that has a flattened outer end and is welded at its inner end to an angle bar 232 that carries a block 233 on its upper surface. The block is secured to the outer end of the piston of the associated power cylinder. Since the power cylinders that carry the clamps 230 are mounted on the frame of the chuck assemblies, they move up and down with the chuck assemblies.

A pair of deckboard stops 234 and 235 are also mounted on the chuck assembly frame 192. Each stop includes a block 236 carried on a rod 237 that is slidable in a bracket 238 which is secured to frame 192. A coil spring 240, freely disposed on the rod 237 between the block 236 and the bracket 238, cushions the impact of the leading edge of the deckboard against the stop block 236.

The pallet turnover bar 29 is pivotally mounted substantially midway between the walls 180 and 181 on a rod 250 which is rotatably mounted in bearings carried by the walls and projects through wall 181. The bar is movable, between the upright half-pallet intercepting position shown in solid lines in FIG. 2 and the half-pallet depositing position shown in phantom lines, by a double-acting pneumatic power cylinder 252 which is mounted on the outside of wall 181 between a lateral support plate, that is connected to the frame structure of the machine, and an arm 254 keyed to the part of rod 250 which extends outwardly past the wall 181.

The turnover bar 29 is a steel member having a main body portion with a forward flat face 255, that is about two inches wide, extending for its full length including the surface 256 of an arm 257 that is pivotally mounted on the lower end of the bar and a beak portion 258 of the bar 29, the inner face 259 of which extends generally outwardly and rearwardly from the face 255 of the main portion of the bar at an angle of about 60 degrees. The arm 257 and the bar have abutment surfaces which permit the arm to pivot counterclockwise from the position shown in FIG. 2 but not clockwise.

Figures 15, 16:
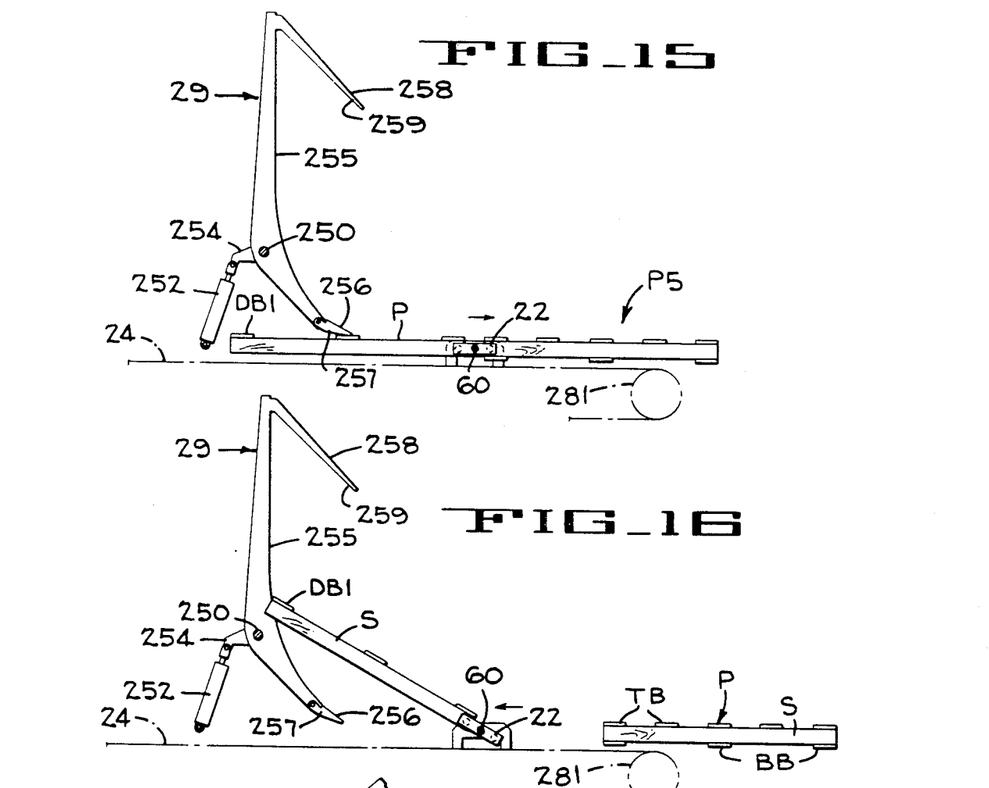
FIGS. 15–19 are diagrammatic views showing consecutive positions of the half-pallet turn-over bar of the pallet-assembly machine.

The action of the turnover bar is shown in FIGS. 15–19. It will be noted in FIG. 15 that when the gripper carriage moves toward the right to push a completed pallet to the discharge station P5, the deckboards on the leading pallet and on the trailing half-pallet engage the arm 257 and pivot it upward as they pass thereunder to obtain clearance. Then, after the full pallet has been released and the half pallet is being pushed rearwardly, the deckboard DB1 at the leading end of the half pallet engages the guide surface of arm 257 and rides up the surface as seen in FIG. 16. When the deckboard DB1 reaches a position approximately halfway between the pivot rod 250 and the point where the surface 255 of the main body portion of the bar meets the surface 259 of the beak portion, the power cylinder 252 is actuated to extend the piston rod to pivot the bar clockwise about rod 250. The speed of pivoting of the turnover bar is coordinated with the speed of upward movement of the deckboard DB1 so that the half pallet is progressively pivoted clockwise as the two gripper carriages rotate about shaft 60. After the deckboard DB1 reaches the point where the guide surfaces 255 and 259 meet each other and the deckboard starts to move along a downwardly descending arc, it moves into engagement with the guide surface 259. During continued rotation of the gripper carriage as it moves rearwardly, the deckboard DB1 slides down the guide surface 259 and is eventually deposited relatively gently on the guide channels, It will be evident that the timing of the pivoting movement of the bar must be such that the arm 257 at its lower end will be raised high enough to permit the half pallet to pass under it. The bar is held in the clockwise pivoted position until the entire half pallet has moved past the arm 257 after which it is returned to the position of FIG. 2.

Figure 17:
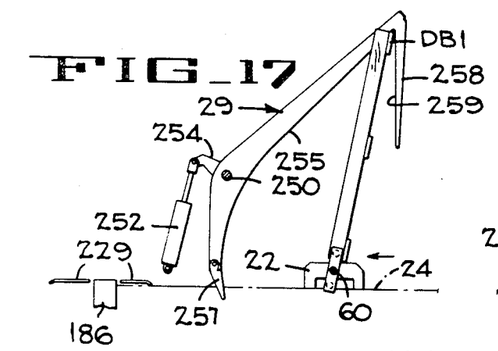
Figure 18:
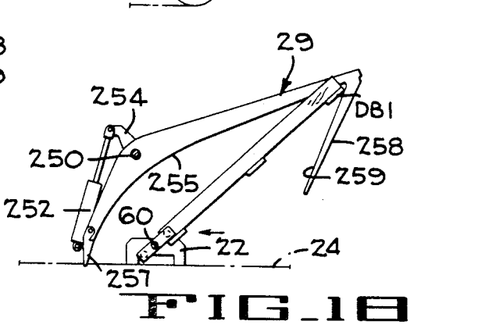
Figure 19:
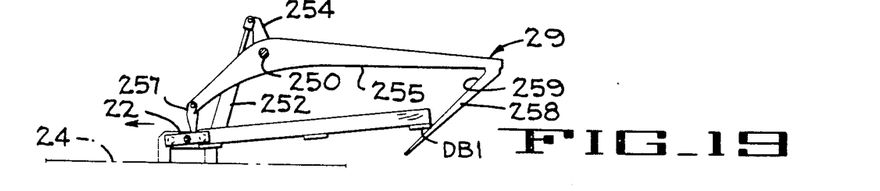

In FIG. 2 the arcuate center line 265 below the turnover bar 29 indicates that, during the clockwise pivoting movement of the bar, the lower end of the arm 257 passes below the plane of the upper surfaces of the two support plates 229. Accordingly, no plates that extend across the machine can be located at the area. Similarly, as seen in FIG. 17, parts of the gripper head 22 also pass below the plane of the support plates 229. To provide support for the outer ends of the half pallets and full pallets being advanced by the gripper carriage after these end portions leave the last support plate 229, four narrow bars 266 (FIG. 4) are mounted on the downstream side of that support plate. The upper surfaces of these bars are in the horizontal plane of plates 229, and they are mounted on the frame structure of the machine in any suitable way, and are narrow enough to support the stringers without interferring with the grippers as they pass below the plane of plates 229, the pads of each gripper head being spaced apart a distance greater than the width of each bar.

Figure 20:
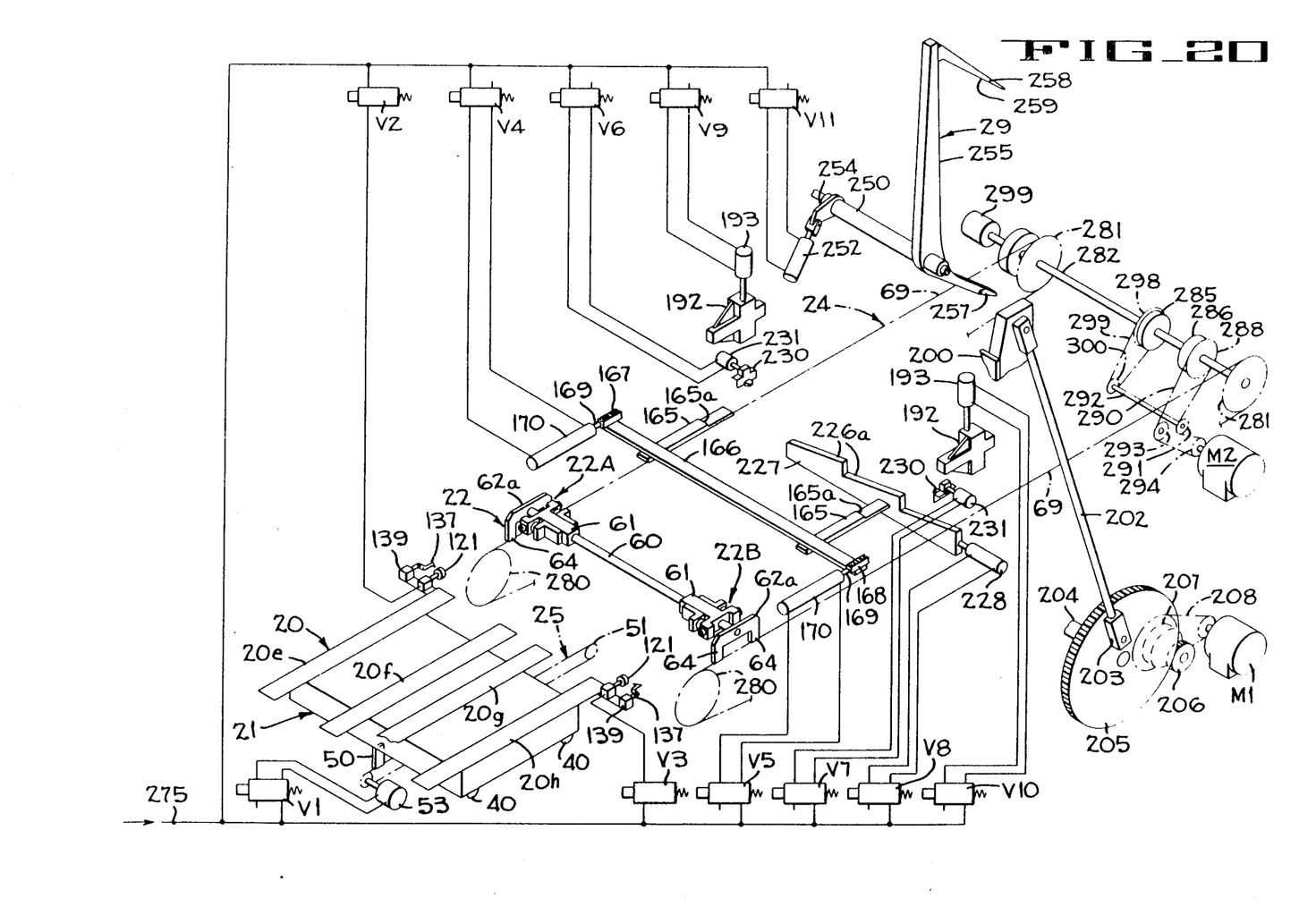
FIG. 20 is a diagrammatic view showing several of the drive mechanisms and the valves and solenoids for controlling their operation.

In FIG. 20 the drive mechanisms of the machine and several of the control devices are illustrated. As mentioned previously, the stringer roller carriage 21 is actuated by an air motor 53 which is controlled by a valve V1 connected to an air supply header. The air chucks 121 receive air from the header 275 through valves V2 and V3. The solenoids 139 that actuate the latches 137 to release the stringer carriage from the gripper carriage are connected to a suitable source of electrical power. The cylinders 170 that move the stripper bars of the deckboard feeder back and forth are connected to the air supply header through valves V4 and V5. Valves V6 and V7 control the cylinders 231 that actuate the deckboard clamps 230. A valve V8 is connected between the header and the cylinder 228 that raises and lowers the nailing anvil by means of the slide bar 227 which has the inclined camming surfaces 226a. The cylinders 193 which raise and lower the nailing chucks through the end plates 192 of the chuck unit are connected through valves V9 and V10 to the header. A valve V11 connects the cylinder 252 of the half-pallet inverting bar 29 to the header. The motor M1 that cycles the nailing head by means of the connecting rod 202 is connected to a source of electric power, as is the motor M2 that drives the gripper carriage through the endless chains 69 of the drive mechanism 24. The chains 69 are trained around sprockets 280 journaled on a cross shaft (not shown) and two sprockets 281 keyed to a drive shaft 282. Two electrically-operated clutch-brake units 285 and 286 are disposed on the shaft 282, each unit having an output member keyed to the shaft and an input sprocket freely rotatable about the shaft and arranged to be moved into gripping engagement with the associated output member to rotate with it. The input sprocket 288 of unit 286 is driven in one direction by the Motor M2 by means of a chain 290 that is trained around the sprocket 288, a sprocket 291 keyed to a countershaft 292, an idler sprocket 293, and a sprocket 294 keyed to the motor shaft. The input sprocket 298 of unit 285 is driven in the direction opposite to the direction of rotation of the input sprocket 288 by a chain 299 trained around the sprocket 298 and a sprocket 300 keyed to countershaft 292. If unit 286 is considered to be the forward drive unit and unit 285 is considered to be the reverse drive unit, when unit 286 is engaged, the gripper carriage is moved forwardly and when unit 285 is engaged the gripper carriage will move rearwardly.

As previously described with reference to FIGS. 2A–D, the gripper carriage 22 moves between the stringer pickup position P2 and the discharge postion P5. At the pickup position, each of the gripping heads 22A and 22B (FIG. 20) engages one of the chucks 121 and receives a charge of air. After the gripper heads move out of engagement with the chucks, the valve 100 in each head maintains sealing engagement with the head as the stringers are drawn under the nailing head to receive the three bottom boards, then moved to the discharge position where the movement of the stringers, which are now part of a half-pallet, is reversed. During the reverse movement, the grippers move the half-pallet through the turnover position and then pull it toward the stringer pickup position P2. While a new set of stringers is being engaged by the gripper carriage, the grip on the stringers of the half-pallet is maintained and it is not released until after the half-pallet has been moved under the nailing head to receive top boards and once more arrives at the discharge position P5.

It will be apparent that the present invention provides a charging mechanism for pneumatic grippers that effectively charges gripper heads and maintains the charge while the gripper heads move along an operating path of substantial length.

A system for controlling the sequence of operation of the machine is disclosed in the application of Ronald J. Billett and Veikko K. Viitanen entitled "Method Of And Apparatus For Making Pallet" filed on even date herewith in the United States Patent and Trademark Office. The control system does not form a part of the present invention but the above Billett et al application is included by reference herein for information.

What is claimed is:

1. In combination, a gripper carriage having a pair of gripper heads, each head having an expansible chamber and an article-gripping unit movable into gripping engagement with an article upon expansion of said chamber, means for reciprocating said carriage between an article-pickup area and an article-discharge area, means for charging said gripping heads and expanding said chambers when said carriage is at the article-pickup area, means on the gripping heads to maintain the charge of air as the carriage travels between the article-pickup area and the article-discharge area, a rotatable member on the carriage carrying the gripping heads and mounted on the carriage for turning movement to rotate the articles about a horizontal axis while being gripped and on said carriage, said rotatable member having a forward and a rearward article gripping unit each of which is concurrently operable to grasp an article with one gripped article leading in a forward direction and with the other gripped article trailing, and means at the article discharge area to operate said means on the gripping heads for releasing the pressure in said forward gripping unit to release the forward article when said carriage is at the discharge area whereby upon return movement toward the article-pickup area the trailing article may be inverted to become the leading article for subsequent release when the gripping unit returns to the article-discharge area.

2. Apparatus in accordance with claim 1 in which said means on the gripping heads to maintain the charge of air include an air valve in fluid communication with said expansible chamber and in which said means at the discharge area for releasing the air pressure comprises an operator for engaging and actuating said air valve as said carriage moves into the article-discharge area.

3. Apparatus in accordance with claim 2 in which said forward and rearward gripping units are diameterically opposed and in which said rotatable member includes a rotatable shaft journaled for rotation in said carriage with a pair of gripping units at opposite ends of the shaft.

4. Apparatus in accordance with claim 1 in which said gripping units are disposed in a generally horizontal plane and are rotated through 180° during rearward movement from the discharge area to swing the article from a trailing position to a leading position.

5. Apparatus in accordance with claim 1 in which the means for reciprocating said carriage comprises elongated chain drives and in which said carriage spans the chain drives.

* * * * *